United States Patent [19]

Mitchell, Jr.

[11] 4,313,296

[45] Feb. 2, 1982

[54] COTTON STRIPPER

[76] Inventor: L. E. Mitchell, Jr., P.O. Box 1367, Levelland, Tex. 79336

[21] Appl. No.: 8,787

[22] Filed: Feb. 1, 1979

[51] Int. Cl.³ ............................................ A01D 46/12
[52] U.S. Cl. ......................................... 56/34; 56/130
[58] Field of Search ...................... 56/30–35, 56/126–130

[56] References Cited

U.S. PATENT DOCUMENTS 2,445,162  7/1948  Wallace ............................. 56/34
3,698,171  10/1972  Hecht .................................. 56/331
4,147,016  4/1979  Jensen et al. ........................ 56/15.8

Primary Examiner—Robert A. Hafer
Attorney, Agent, or Firm—Wendell Coffee

[57] ABSTRACT

Cotton bolls, along the fingers of a cotton stripper, are brushed upward to the conveyor by brushes mounted upon chains which run on sprockets on either side of the fingers. The speed of the brushes along the finger is slower than the speed of the stripper along the ground and also slower than 300 feet per minute to prevent throwing the light fluffy cotton from the stripper.

10 Claims, 2 Drawing Figures

COTTON STRIPPER

BACKGROUND OF THE INVENTION (1) Field of the Invention

This invention relates to cotton strippers.

(2) Description of the Prior Art

In commercial practice today, cotton is harvested by either picking the cotton from the burr on the stalk or by stripping the entire boll of cotton from the stalk. The stripping may be accomplished by a stripper having rotating elements which extend along the stalk or by having a plurality of parallel fingers which angle upward from a finger tip near the ground to a cross conveyor behind the fingers. U.S. Pat. No. 3,927,511 to Burris et al. discloses such a cotton stripper as is in commercial use at the time of my invention. In addition to the fingers and conveyor, there is a series of kickers upon a shaft above the conveyor which kick some of the cotton and any weeds, large branches or the like which might tend to clog the fingers adjacent to the conveyor.

Before this application was filed, applicant caused a search to be made in the United States Patent and Trademark Office during which the following patents were discovered in addition to the Burris et al. Patent:

U.S. Pat. No. 1,294,898, Griffith;
U.S. Pat. No. 1,907,467, Tervo;
U.S. Pat. No. 1,990,816, Conrad;
U.S. Pat. No. 2,639,573, McLaughlin;

Conrad discloses a cotton harvesting machine which depends upon fingers to strip the cotton from the stalk. Bars are mounted on a single endless chain to pull the cotton up the fingers.

The other three patents disclose harvesting agricultural products other than cotton, such as beans, nuts or cranberries. These other type machines use brushes.

SUMMARY OF THE INVENTION (1) New and Different Function

I have invented a method for harvesting cotton and a machine for carrying this method out which utilizes the standard finger type stripper. My invention improves the operation of the stripper by brushing the stripped cotton upward along the fingers or tines with bars or brushes which extend across the table, i.e., the set of fingers. I have discovered that the brushes must operate at a very slow speed, otherwise, the light fluffy locks of cotton will be thrown out of the stripper. It is necessary in all normal operating conditions to have the speed of the brushes along the table to be less than the speed of the stripper along the ground otherwise the stalks are broken.

Also, it is necessary on normal cotton to normally only use two brushes, i.e., no more than one brush is in contact with the fingers at any one time. By normal cotton I mean normally the type of cotton that is stripped which is a closed boll, storm proof variety of cotton. However, if a more open boll type cotton is being grown wherein the burr tends to shatter and the locks of cotton fall from the boll upon being stripped from the stalks, it is desirable to have as many as four brushes. In this situation there will be as many as two brushes contacting the fingers at one time, however, there will be no more than two brushes at any one time.

In certain operations, the table may be clogged with dirt. According to one embodiment of my invention, the brushes may be lifted when this occurs.

Thus, it may be seen that the total function of my invention far exceeds the sum of the functions of the individual sprockets, chains, brushes, etc.

(2) Objects of this Invention

An object of this invention is to strip cotton.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENTS

Figure 1:
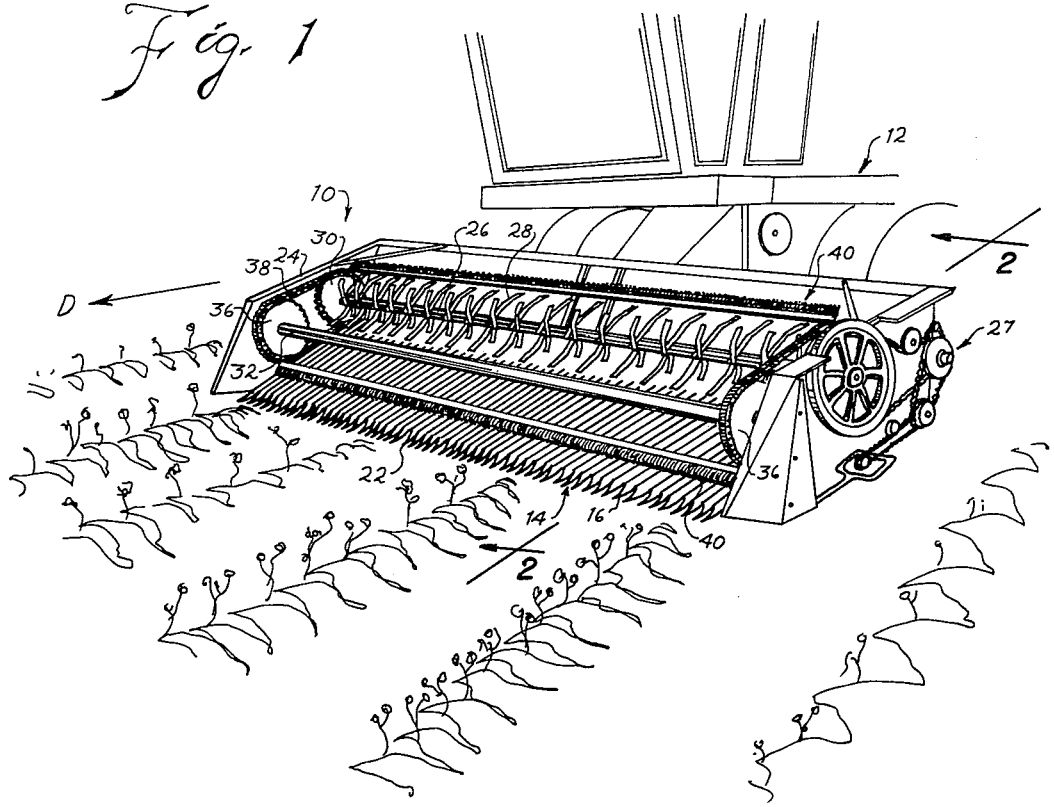
FIG. 1 is a perspective view of a cotton stripper according to my invention.
Figure 2:
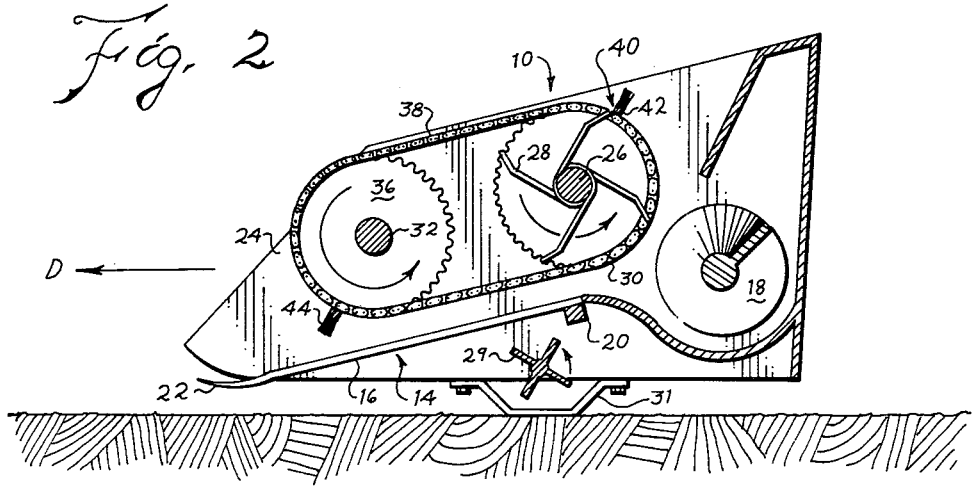
FIG. 2 is a cross sectional view thereof taken substantially on line 2—2 of FIG. 1.

Referring to FIG. 1 of the drawing, shows cotton stripper 10. As may be seen, the stripper is mounted upon vehicle 12 which forms a transport means for moving the stripper through the cotton field in a direction of draft D. The stripper itself includes table 14 of fingers 16. To the rear of the table 14 is cross conveyor 18 in the form of an auger conveyor. Suitable means is provided for driving the conveyor, however, they have not been shown for clarity of the drawings.

The fingers 16 extend forwardly from the header or beam 20 adjacent to the cross conveyor 18 and have finger tips 22. As is conventional, each of the fingers are parallel to the others and each finger extends forward and downward from adjacent the conveyor 18 to the finger tips 22 which are near the ground. The fingers extend parallel to the intended direction of draft D. Side shields 24 which mount beams 20 extend on either side of the table 14.

Rear traverse shaft 26 is mounted upon the stripper 10 by being journalled within bearings upon the side shields 24. Means 27 for driving the rear traverse shaft, including sprockets, etc., are provided. Rear traverse shaft 26 has a plurality of kickers 28 mounted on the periphery thereof.

Stalk walker or roller 29 is located adjacent to the ground below the rear traverse shaft 26 and changes 16. The stalk walker or roller pushes the stalks forward and prevents them from being caught at the throat of the fingers 16 adjacent to the header 20. The stalk walker or roller 29 is driven by the drive means 27 all of which is well within the skill of the art and disclosed in Burris et al. Skid 31 mounted upon the bottom of the side shields 24 limits the downward movement of the stripper 10.

Those having ordinary skill in the art will recognize that the stripper, as described to this point, is conventional and commercially available on the market today.

I have modified such a conventional commercial machine by adding rear shaft 30 to each end of the back shaft 26. The rear sprockets are located adjacent to the side shields 24. Front shaft 32 is journalled by bearings mounted upon the side shields 24. The front shaft is disposed above the finger tips 22. Front sprockets 36 are attached to the front shaft on each end thereof adjacent to the side shield 24. Chain 38 is trained around front sprocket 36 and rear sprocket 30 adjacent each side of the table 14. The front sprockets 36 and front shaft 32 will have a common axis and this common axis is parallel to the rear traverse shaft 26.

At least two brush bars 40 are attached at each end to the transversely spaced chains 38. Each brush bar will include backing strip 42 made of suitable material having stiff bristles 44 projecting therefrom. The stiff bristles may be thought of as flexible tines to rake or sweep or brush the cotton along the fingers 16 from the finger tips 22 back to the conveyor 18. I prefer to use a brush bar having stiff Nylon bristles about two inches (5 cm) long, i.e., the bristles extend about two inches from the brush bar to the tip of the bristles.

According to my invention it is necessary to modify the means for rotating the rear traverse shaft 26 so that it rotates at about 25 rpm. I have found it necessary that the speed of the brushes be quite slow. If the speed of the brushes exceeds about 300 feet per minute (90 meter/minute), the light fluffy locks of cotton will tend to be thrown from the stripper. The locks of cotton may be either thrown away from the conveyor or thrown forward from the front tip shaft. In any event, I find it necessary to modify the means for driving the rear shaft. Of course, those having ordinary skill in cotton harvesting and cotton harvesting machines will understand how to change the speed of rotation of shafts to the desirable speed.

The normal speed for operating a cotton harvester is about 264 feet per minute (80 meter/minute). Furthermore, the speed of the movement of the stripper along the ground must be greater than the speed of the brushes along the fingers. Stated otherwise, the speed of the brushes along the fingers is slower than the speed of the stripper along the ground. The speed of the brushes will be the same as the speed of the chain and, therefore, what has been said about the speed of the brushes is also true of the speed of the chain.

If the speed of the brushes is greater than the speed of the stripper along the ground, trouble is encountered because the brushes will tend to pull the stalks into the throat of the fingers 16 against the beam 20 and the action of the stalk walker or roller 29 will cause the stalks to break. This will either cause the stalks to jam up against the throat or be carried on with the harvested cotton into the conveyor 18, which is undesirable. Therefore, it may be seen that there are two limitations on the speed of the brushes and both of them are maximum limitations. First, the brushes must move slower along the fingers than the stripper moves along the ground and, second, the brushes must never exceed about 300 feet per minute (90 meter/minute), regardless of the speed of the stripper along the ground.

I have found that four is the maximum number of brushes desired. As stated above, for the normal type of stripped cotton only two brushes are desired.

Although with my invention the kickers 28 on the back shaft 26 are not as necessary as they were before my invention, I desire not to remove them from the back shaft. Occasionally, large weeds or thistles are encountered in the cotton field and it is desired to have the kickers to move them away from the cross conveyors so that they do not choke and clog the machine.

Figure 3:
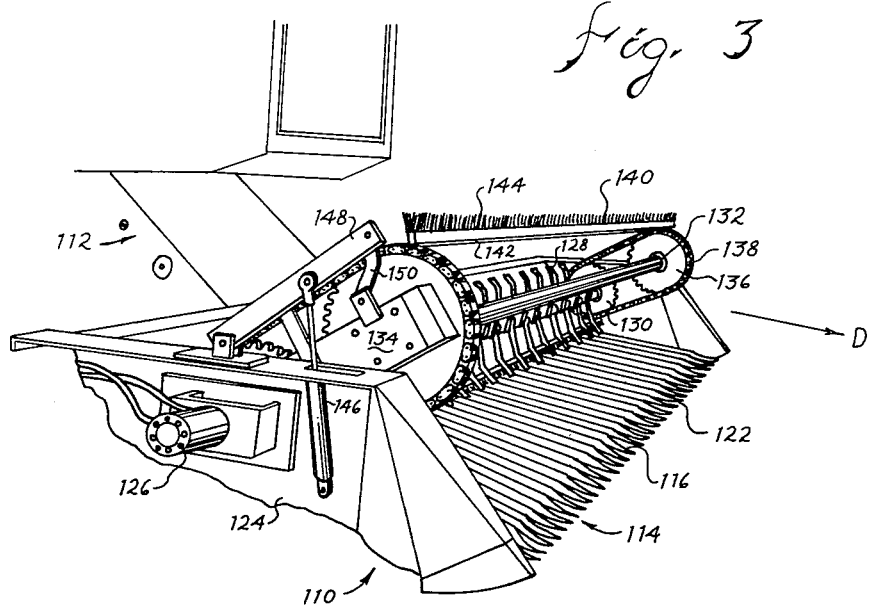
FIG. 3 is a perspective view of a second embodiment.

FIG. 3 shows another embodiment of my invention. In FIG. 3, stripper 110 is mounted upon vehicle 112. The stripper includes table 114 of fingers 116. The cross conveyor is not shown but would be present as above. Likewise, the fingers would be as disclosed heretobefore. The fingers have tips 122 adjacent to the ground and side shields 124. In this embodiment, the back shaft is driven by hydraulic motor 126. By suitable controls within the vehicle 112, the speed of the hydraulic motor 126 and, thus, the speed of the back shaft and the back sprocket 130 and the chains 138 could be adjusted according to the requirements as perceived by the operator in the vehicle 112. The back shaft would carry kickers 128 and the chain would carry two brush bars 140, each brush bar having backing 142 and bristles 144.

In this embodiment, the front shaft 132, carrying the front sprockets 136, is mounted by suitable bearings on front on arms 134. The front arms 134 have one end thereof journalled on the back shaft carrying the kickers 128. Means is provided on the side shields for raising the front shaft 132 away from the fingers 116. When the front shaft is raised, this also raises the chains 138 and brush bars 140. Raising the brush bars is desirable because the operator, through inadvertance or irregularities of the ground, will permit the finger tips 122 to dip into the top of the beds wherein the cotton is grown. The skids of the side shields 124 will be in the furrow. Dipping into the bed causes a pile of dirt to accumulate on the table 114. The excessive dirt on the table will tend to clog the table and the brush bars 140 will be stalled. However, when the front shaft 132 is raised, the brush bars can rotate. Then the front shaft 132 may be slowly lowered till the brushes just engage the pile of dirt on the table 114. The dirt is removed by falling between the fingers 116. Normal operation is re-established without the operator having to leave the vehicle 112.

The means for raising the tip shaft 132 includes hydraulic cylinder 146 extending from the side shield to lifting arm 148. The lifting arm 148 has the back end pivoted to the top of the side shield 124 and the front end connected by link 150 to the tip arm 134. Of course, the controls and hydraulics supply for the hydraulic cylinder 146 is furnished in the cab of the vehicle 112 as are the controls and source of hydraulic fluid for the hydraulic motor 126.

Figure 4:
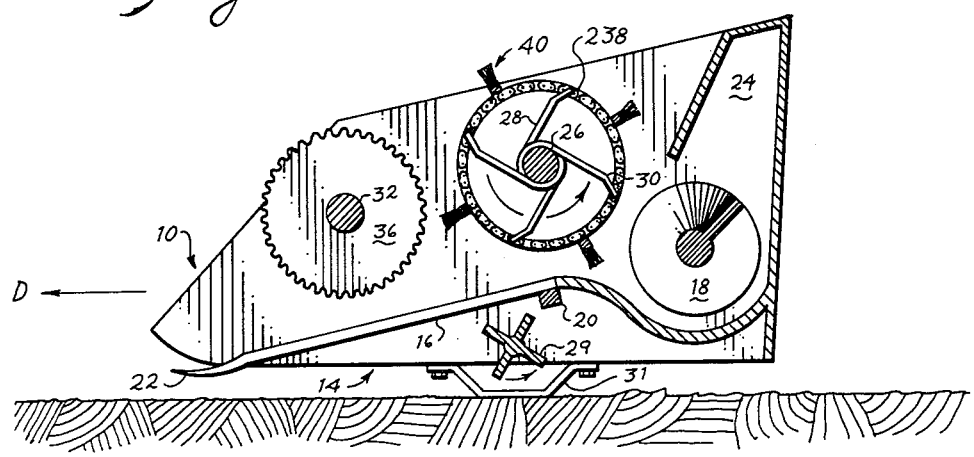
FIG. 4 is a view similar to FIG. 2 of another embodiment.

In taller cotton, i.e., where the cotton stalks are tall, it is not necessary to brush the fingers 16 all the way from the finger tip 22 to the cross conveyor 18. In such an event, the brushes bars 40 can be mounted so that they revolve around the perimeter of the back sprockets 30 (FIG. 4). This is easily accomplished by mounting chains 238 so that the length of the chain is the circumference of the back sprocket, i.e., the chain itself extends around the circumference of the back sprocket. In such an event the tip sprockets 36 are not necessary. However, this finger type cotton stripper is more commonly used for smaller, shorter cotton stalks.

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a cotton stripper having
   a. transport means attached to the stripper for moving the stripper through the cotton field in a direction of draft,
   b. a conveyor on the stripper traverse of the direction of draft,
   c. a plurality of parallel fingers on the stripper extending along the direction of draft from the conveyor forward and downward terminating with
   d. finger tips near the ground, and
   e. side shields on the stripper extending on both sides of the fingers;
   the improved structure comprising in combination with the above:
   f. a rear shaft on the stripper parallel to and above the conveyor,
   g. rear sprockets on each end of the rear shaft,
   h. a hydraulic motor connected to the sprockets for rotating the rear shaft,
   j. front sprockets mounted and adjacent each side shield
   k. having a common axis parallel to the rear shaft,
   m. chains running around the sprockets adjacent each side shield, and
   n. at least two brush bars parallel to the rear shaft attached to and extending between the chains,
   o. said hydraulic motor rotating the rear shaft so that the speed of the chain on the stripper is less than the speed of the stripper on the ground.

2. The invention as defined in claim 1 further comprising:
   p. said brushes moving along said fingers at a speed less than 300 feet per minute.

3. The invention as defined in claim 2 further comprising:
   q. a front shaft extending between said two tip sprockets.

4. The invention as defined in claim 3 further comprising:
   r. means on the side shields for raising said front shaft away from said fingers.

5. The invention as defined in claim 4 further comprising:
   s. there being no more than four brush bars attached to and extending between the chains.

6. The invention as defined in claim 5 further comprising:
   t. each brush bar having stiff Nylon bristles about two inches long which sweep along the fingers.

7. The invention as defined in claim 6 wherein
   u. said rear shaft is a standard kicker shaft.

8. The method of harvesting cotton with a cotton stripper having
   a. transport means for moving the stripper through the cotton field in a direction of draft,
   b. a conveyor traverse of the direction of draft,
   c. a plurality of parallel fingers extending along the direction of draft from the conveyor forward and downward terminating with
   d. finger tips near the ground, and
   e. side shields extending on both sides of the fingers;
   comprising the improved steps of:
   f. brushing the stripped cotton upward along the fingers from near the finger tips to the conveyor,
   g. moving the stripper through the field at a stripper speed, and
   h. moving brushes along the fingers to perform the brushing step at a speed less than the stripper speed.

9. The invention as defined in claim 8 further comprising:
   j. raising the brushes from the finger tips during selected operating conditions.

10. The invention as defined in claim 9 further comprising:
    k. moving brushes along the fingers to perform the brushing step, and
    m. contacting the fingers with not more than two brushes at any one time.

* * * * *